(12) United States Patent
Yamada et al.

(10) Patent No.: US 7,176,643 B2
(45) Date of Patent: Feb. 13, 2007

(54) MOTOR CONTROL APPARATUS

(75) Inventors: Masakazu Yamada, Nagoya (JP); Shigeru Kamio, Nagoya (JP); Yasushi Kobiki, Toyota (JP)

(73) Assignees: Denso Corporation, Kariya (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 11/264,385

(22) Filed: Nov. 2, 2005

(65) Prior Publication Data

US 2006/0103339 A1    May 18, 2006

(30) Foreign Application Priority Data

Nov. 2, 2004  (JP) .............................. 2004-318644

(51) Int. Cl.
*H02K 7/10*   (2006.01)

(52) U.S. Cl. .............................. 318/9; 318/3; 318/623; 477/15; 477/7; 477/34

(58) Field of Classification Search .................... 318/9, 318/3, 623; 477/15, 7, 34
See application file for complete search history.

(56) References Cited

U.S. PATENT DOCUMENTS

| | | | | |
|---|---|---|---|---|
| 4,243,072 A | * | 1/1981 | Hoffman et al. | 137/637.1 |
| 4,639,869 A | * | 1/1987 | Storm | 74/457 |
| 4,817,471 A | * | 4/1989 | Tury | 477/125 |
| 5,672,137 A | * | 9/1997 | Adachi et al. | 477/45 |
| 6,200,177 B1 | * | 3/2001 | Scott et al. | 440/75 |
| 2002/0027031 A1 | * | 3/2002 | Miyata | 180/219 |
| 2003/0060328 A1 | * | 3/2003 | Beaty | 477/109 |
| 2003/0222617 A1 | * | 12/2003 | Nakai et al. | 318/701 |
| 2004/0066166 A1 | | 4/2004 | Nakai et al. | 318/701 |

FOREIGN PATENT DOCUMENTS

| | | |
|---|---|---|
| JP | 2002-323127 | 11/2002 |
| JP | 2004-23890 | 1/2004 |
| JP | 2004-23932 | 1/2004 |
| JP | 2004-190839 | 7/2004 |

\* cited by examiner

*Primary Examiner*—Rita Leykin
(74) *Attorney, Agent, or Firm*—Nixon & Vanderhye P.C.

(57) ABSTRACT

Before an amount of play in a rotation transmitting system is learned, for selecting a gear range, an overshooting control process is performed to cause the angular displacement of a motor to overshoot a target gear range position and then reverse the electric motor. The angular displacement of the motor overshoots the target get gear range position by an overshooting amount that is identical to am amount by which the electric motor is reversed. The overshooting amount is set to a maximum value of a designed amount of play in the rotation transmitting system After the amount of play is learned, for selecting a gear range, a target count is established in view of the learned amount of play and the direction in which the motor rotates, and the motor is stopped at a position where an encoder pulse count coincides with the target count without performing the overshooting control process.

6 Claims, 10 Drawing Sheets

MOTOR CONTROL APPARATUS

CROSS-REFERENCE TO RELATED APPLICATIONS

This application is based upon and claims the benefits of priority from the prior Japanese Patent Application No. 2004-318644, filed on Nov. 2, 2004, the entire contents of which are incorporated herein by reference.

BACKGROUND OF THE INVENTION

1. Field of the Invention

The present invention relates to a motor control apparatus for controlling the angular displacement of an electric motor which selects operated positions of a controlled object.

2. Description of the Related Art

To meet requirements for better space saving capability, improved assemblability, and increased controllability, more and more mechanical systems on automobiles and other equipment have in recent years been replaced with motor-operated systems. For example, Japanese laid-open patent publication No. 2002-323127 discloses a motor-operated gear range selector mechanism for an automatic transmission for use on vehicles. The disclosed motor-operated gear range selector mechanism has an output shaft connected to the rotational shaft of a motor through a speed reducer. The gear range selector mechanism is operated by the output shaft for selecting gear ranges of the automatic transmission. The motor is combined with a rotational angle detector, i.e., an encoder, for detecting the angular displacement or rotational angle of the motor. For selecting a desired gear range, the motor is energized to rotate the rotational shaft to a target position (target count) corresponding to the desired gear range based on the count of output pulses from the encoder, thereby shifting the automatic transmission into the desired gear range.

The angular displacement or rotational angle of a motor which controls an object is converted into the angular displacement of the controlled object, i.e., the controlled variable of a gear range selector mechanism, through a rotation transmitting system such as a speed reducer or the like. The rotation transmitting system is made up of various discrete components, and there is play or lost motion between those components. For example, there is play or backlash between the gears of a speed reducer mechanism. If a joint having a noncircular cross section, such as a rectangular cross section, a D-shaped cross section, or the like, on the tip end of the rotational shaft of the speed reducer mechanism is fitted into a hole in the joint shaft of the controlled object, then a clearance needs to be provided between the joint and the inner surface of the hole to allow the joint to be easily fitted into the hole. Therefore, since the rotation transmitting system for transmitting the angular displacement of the motor into the angular displacement of the controlled object has play or lost motion, even when the angular displacement of the motor is accurately controlled based on the angular displacement detected by the rotational angle detector, the resultant angular displacment placement of the joint shaft of the controlled object, i.e., the resultant controlled variable of the gear range selector mechanism, suffers an error commensurate with the play or lost motion of the rotation transmitting system. Consequently, the controlled variable of the gear range selector mechanism cannot be controlled with accuracy.

In view of the above drawback, there has been proposed a technology for energizing the motor under bump control until the movable element of the gear range selector mechanism bumps into a limit position of the movable range thereof, i.e., a wall of the gear range selector mechanism, thereby learning the amount of play included in the rotation transmitting system, and setting or correcting a target position in view of the learned amount of play, as disclosed in Japanese laid-open patent publication No. 2004-23932.

According to the disclosed proposal, after the movable element of the gear range selector mechanism bumps into a limit position of the movable range thereof, i.e., a wall of the gear range selector mechanism under bump control, the movable element is also caused under bump control to bump into another limit position of the movable range, i.e., another wall of the gear range selector mechanism. Pulses that are output from the encoder while the motor is being energized from one of the limit positions to the other are counted to measure the movable range of the gear range selector mechanism. The difference between the measured movable range of the gear range selector mechanism and the designed movable range of the gear range selector mechanism is learned as the amount of play in the rotation transmitting system.

The gear range selector mechanism disclosed in Japanese laid-open patent publication No. 2004-23932 has two gear ranges, i.e., a parking range and a non-parking range. When the gear range selector mechanism is to shift the transmission into the parking range or the non-parking range after the engine has started, bump control in the parking range and bump control in the non-parking range are successively performed to learn the amount of play in the rotation transmitting system.

If, however, the gear range selector mechanism is to shift the transmission into four ranges, i.e., a parking range (P range), a reverse range (R range), a neutral range (N range, and a drive range (D range), then for learning the amount of play in the rotation transmitting system, bump control in the P range is performed, and thereafter bump control in the D range needs to be performed when the transmission is shifted successively into the P, R, N, and D ranges. While the gear range selector mechanism shifts the transmission between the P, R, and N ranges, bump control in the D range cannot be performed. This is because if the transmission is automatically shifted into the D range against the will of the driver while the engine is in operation, then the vehicle may get into motion undesirably. Consequently, until the driver moves the gear shift lever into the D range, the amount of play in the rotation transmitting system cannot be learned, and the controlled variable of he gear range selector mechanism suffers an error commensurate with the play or lost motion of the rotation transmitting system. As a result, the gear range selector mechanism may possibly fail to select desired gear ranges based on the gear shift lever operated by the driver.

SUMMARY OF THE INVENTION

It is an object of the present invention to provide a motor control apparatus for use with a rotation transmitting system, which has play or lost motion, for transmitting the angular displacement of a motor to a controlled object, the motor control apparatus being capable of accurately controlling the controlled variable of the controlled object without being affected by the play or lost motion in the rotation transmitting system even before the amount of play in the rotation transmitting system is learned, so that operated positions of the controlled object can be selected with increased accuracy.

If a rotation transmitting system for transmitting the angular displacement of an electric motor to a controlled object has play or lost motion, then when the motor starts to rotate, the motor idles until the play in the rotation transmitting system is eliminated, and thereafter the rotation of the motor is transmitted to the controlled object. Therefore, when the motor is simply rotated up to a target position corresponding to an operated position of the controlled object, the controlled variable of the controlled object suffers a shortage corresponding to the idling motion (the amount of play) of the motor at the time it starts to rotate.

According to the present invention, a motor control apparatus controls the angular displacement of an electric motor as an actuator for selecting operated positions of a controlled object. For selecting one of the operated positions of the controlled object, a controller performs an overshooting control process to cause the angular displacement of the electric motor to overshoot a target position corresponding to the operated position of the controlled object, and thereafter reverse the electric motor. At the start of rotation of the electric motor, even if only the motor idles until play or lost motion in a rotation transmitting system is eliminated, the electric motor is rotated an extra angle corresponding to the idling amount, i.e., the amount of play, at the start of rotation of the electric motor according to the overshooting control process to make it possible to shift the controlled object to a target operated position. When the electric motor is rotated back from the overshot position, only the electric motor can idle an angle corresponding to the play or lost motion in the rotation transmitting system without moving back the controlled object. Therefore, even before the amount of play in the rotation transmitting system is learned, the operated amount of the controlled object can be controlled highly accurately without being affected by the play or lost motion in the rotation transmitting system. The accuracy with which to change the operated positions of the controlled object is therefore increased.

The angular displacement of the electric motor may overshoot the target position by an overshooting amount which is identical to a reversing amount by which the electric motor is reversed. If the overshooting amount of the electric motor is greater than an actual amount of play in the rotation transmitting system, then the operated position of the controlled object moves beyond the target position by the difference between the overshooting amount and the amount of play. However, because the overshooting amount and the reversing amount are set to an identical value, the operated position of the controlled object reliably goes back to the target position due to reversal of the electric motor.

If the overshooting amount of the electric motor is smaller than the amount of play in the rotation transmitting system, then the overshooting amount of the electric motor is smaller than the idling amount thereof at the start of rotation of the electric motor, resulting in a shortage of the operated amount of the controlled object. Conversely, if the overshooting amount of the electric motor is too large, a delay in selecting operated positioned of the controlled object due to the overshooting control process may possibly become non-negligible.

The motor control apparatus may further comprise a rotation transmitting system for transmitting the angular displacement of the electric motor to the controlled object, the rotation transmitting system including an amount of play, and the angular displacement of the electric motor may overshoot the target position by an amount which is equal to or greater than a maximum value of the amount of play in the rotation transmitting system. With this arrangement, the overshooting amount of the electric motor is greater than the idling amount thereof (the amount of play) at the start of rotation of the electric motor at all times. Consequently, the operated position of the controlled object can reliably be shifted to the target position, and any delay in selecting operated positioned of the controlled object due to the overshooting control process is minimized.

The motor control apparatus may further comprise a rotation transmitting system for transmitting the angular displacement of the electric motor to the controlled object, the rotation transmitting system including an amount of play, and a learning unit for learning the amount of play in the rotation transmitting system by rotating the electric motor until a movable element of the rotation transmitting system bumps into a limit position of a movable range of the controlled object. Before the learning unit learns the amount of play in the rotation transmitting system, the controller may perform the overshooting control process for selecting the one of the operated positions of the controlled object, and after the learning unit learns the amount of play in the rotation transmitting system, the controller may establish the target position in view of the learned amount of play and a direction in which the electric motor rotates, and stop the electric motor at the target position for selecting the one of the operated positions of the controlled object, without performing the overshooting control process. With this arrangement, the overshooting control process is performed only before the amount of play is learned, and is not performed after the amount of play is learned. Therefore, the operated positions of the controlled object can be selected with a good response.

If the rotating direction of the electric motor is the same as the direction of the reversing action in the overshooting control process, then as the play in the rotation transmitting system is eliminated from the start of rotation of the electric motor, the electric motor does not idle from the start of rotation thereof, and the angular displacement or rotational angle of the electric motor is fully converted into the angular displacement or rotational angle of the operated amount of the controlled object.

In view of the foregoing, if a direction in which the electric motor rotates is the same as a direction in which the electric motor is reversed in the preceding overshooting control process, then the controller may control the angular displacement of the electric motor to reach the target position corresponding to the one of the operated positions of the controlled object, without performing the overshooting control process. Therefore, if the direction in which the electric motor rotates is the same as a direction in which the electric motor is reversed in the preceding overshooting control process, then the overshooting control process is not performed, allowing the operated positions of the controlled object to be selected with a good response.

The principles of the present invention are applicable to various position selecting apparatus having an electric motor as an actuator. For example, the present invention is applicable to a system in which an electric motor operates a gear range selector mechanism for selecting gear ranges of an automatic transmission for use on a vehicle. The motor-operated gear range selector mechanism according to the present invention is highly reliable.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENT

Figure 1:
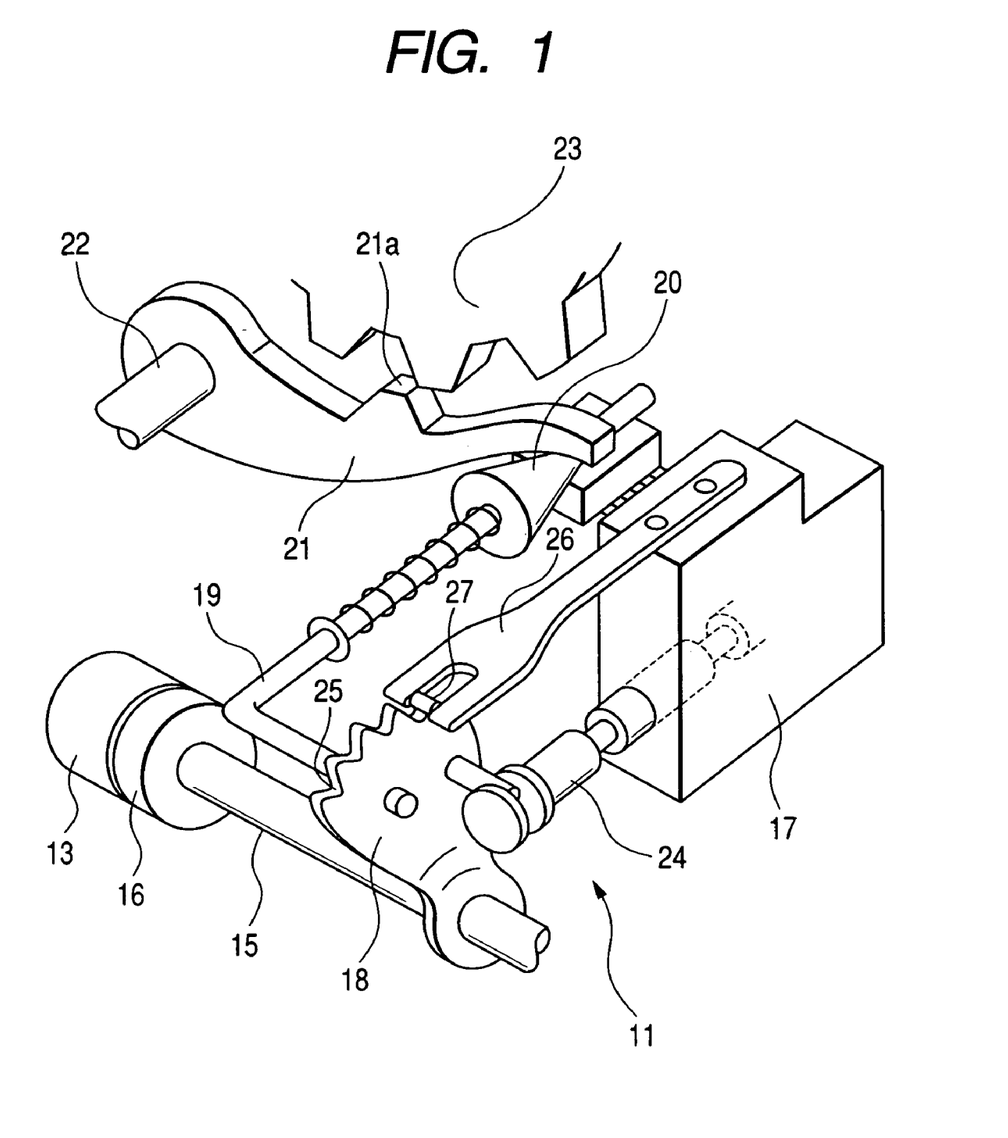
FIG. 1 is a perspective view of a gear range selector mechanism according to an embodiment of the present invention.
Figure 2:
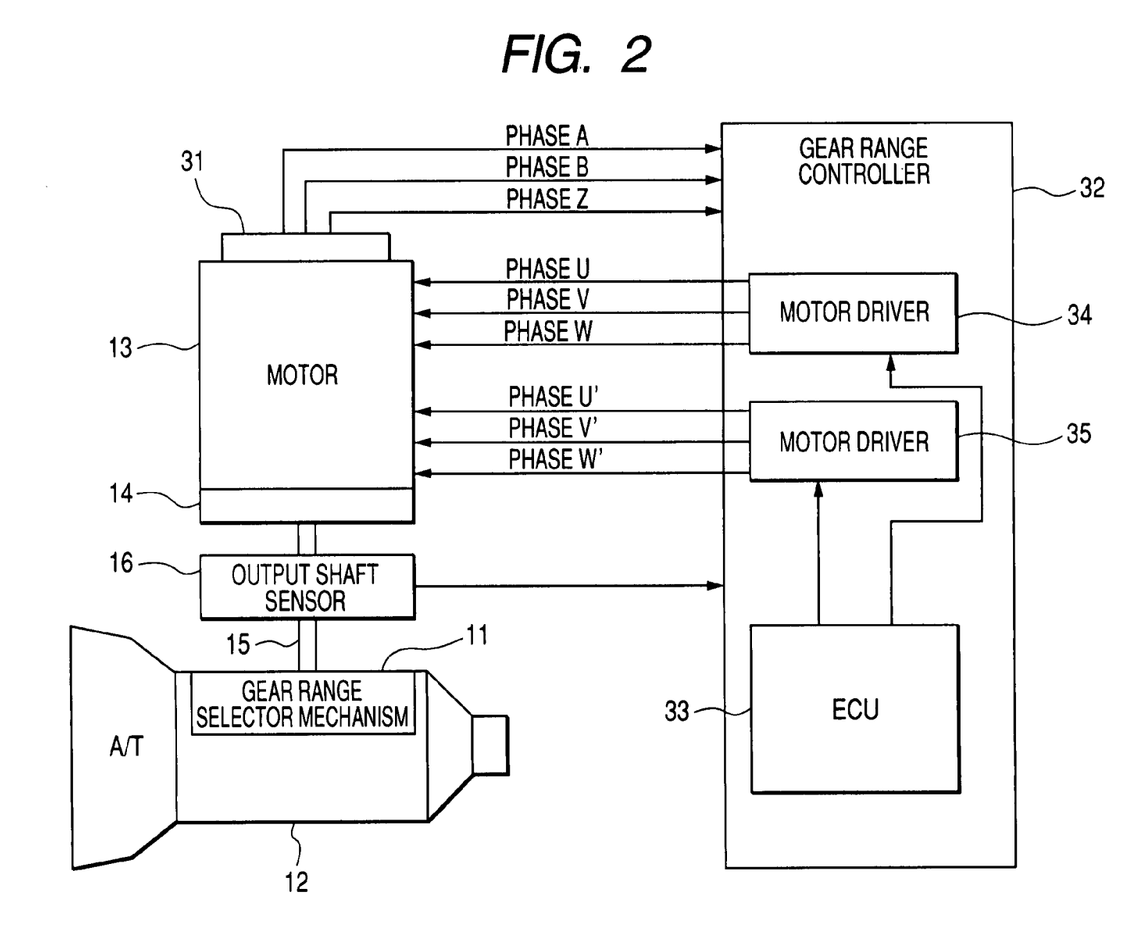
FIG. 2 is a block diagram of a control system for controlling the gear range selector mechanism.

A gear range selector mechanism 11 according to an embodiment of the present invention will first be described below with reference to FIGS. 1 and 2. The gear range selector mechanism 11 serves to select a parking range (P range), a reverse range (R range), a neutral range (N range, and a drive range (D range) of an automatic transmission 12 on a vehicle. The gear range selector mechanism 11 is operatively coupled to an electric motor 13 as a drive source which may comprise a synchronous motor such as a switched reluctance motor (SR motor) or the like. The electric motor 13 incorporates a speed reducer 14 (see FIG. 2) having a rotational shaft coupled to an output shaft 15 which is combined with an output shaft sensor 16 for detecting the angular displacement or rotational angle of the output shaft 15. The output shaft sensor 16 comprises a rotational angle sensor, e.g., a potentiometer, whose output shaft changes linearly depending on the angular displacement or rotational angle of the output shaft 15 coupled to the speed reducer mechanism 14. The present angular displacement or rotational angle of the output shaft 15, and hence the present gear range, either one of the P, R, N, and D ranges, of the automatic transmission 12 can be confirmed based on the output voltage of the output shaft sensor 16.

A detent lever 18 for controlling a manual valve 17 in a hydraulic circuit of the automatic transmission 12 is fixed to the output shaft 15. To the detent lever 18, there is fixed an end of an L-shaped parking rod 19 having on its other end a cone 20 held against a lock lever 21. The lock lever 21 is vertically angularly movable about a shaft 22 depending on the position of the cone 20 with respect to the lock lever 21 for selectively locking and unlocking a parking gear 23. The parking gear 23 is mounted on the output shaft of the automatic transmission 12. When the parking lever 23 is locked by the lock lever 21, the drive wheels of the vehicle are locked against rotation, thereby parking the vehicle.

The detent lever 18 is coupled to a spool valve 24 of the manual valve 17. When the electric motor 13 angularly moves the output shaft 15 and the detent lever 25, the controlled variable of the manual valve 17, i.e., the position of the spool valve 24, is changed to cause the automatic transmission 12 to select either one of the P, R, N, and D ranges. The detent lever 18 has four retaining recesses 25 (see FIG. 3) defined successively in an outer arcuate edge thereof for retaining the spool valve 24 selectively in positions which correspond respectively to the P, R, N, and D ranges.

A detent spring 26 for keeping the detent lever 18 selectively in angularly spaced positions which correspond respectively to the P, R, N, and D ranges is fixedly mounted on the manual valve 17. The detent spring 26 has an engaging bar 27 on its distal end which is selectively fitted in the retaining recesses 25. When the engaging bar 27 is fitted in one of the retaining recesses 25 in the detent lever 18 which corresponds to a desired gear range, the detent lever 18 is kept at a rotational angle corresponding to the gear range, and the spool valve 24 is retained in the position corresponding to the gear range.

In the P range, the parking rod 19 is displaced toward the lock lever 21, causing a larger-diameter portion of the cone 20 to lift the lock lever 21 until a tooth 21a of the lock lever 21 fits into a slot between gear teeth of the parking gear 23, whereupon the parking gear 23 is locked. The output shaft of the automatic transmission 12 and hence the drive wheels of the vehicle are locked to park the vehicle.

In the other gear ranges than the P range, the parking rod 19 is displaced away from the lock lever 21, moving the larger-diameter portion of the cone 20 away from the lock lever 21, which is lowered. The tooth 21a of the lock lever 21 is now disengaged from the parking gear 23, whereupon the parking gear 23 is unlocked. The output shaft of the automatic transmission 12 and hence the drive wheels of the vehicle are now unlocked to allow the vehicle to start moving.

The electric motor 13 is combined with an encoder 31 for detecting the angular displacement or rotational angle of the rotor of the electric motor 13. The encoder 31 comprises a magnetic rotary encoder, for example. The encoder 31 outputs pulse signals in phases A, B, Z to a gear range controller 32 in synchronism with rotation of the rotor of the electric motor 13. The gear range controller 32 has an ECU 33 for counting both positive-going edges and negative-going edges of phase-A and phase-B signals output from the encoder 31. Depending on the encoder pulse count, the ECU 33 controls motor drivers 34, 35 to turn on energized phases of the electric motor 13 in a predetermined sequence to rotate the rotor of the electric motor 13.

The direction in which the rotor rotates is determined based on the order in which the phase-A and phase-B signals are generated. When the rotor of the electric motor 13 rotates in a normal direction, i.e., a direction to shift from the P range to the D range, the ECU 33 counts up encoder pulses. When the rotor of the electric motor 13 rotates in a reverse direction, i.e., a direction to shift from the D range to the P range, the ECU 33 counts down encoder pulses. Therefore, regardless of whether the rotor rotates in the normal direction or the reverse direction, the encoder pulse count and the angular displacement or rotational angle of the electric motor 13 are commensurate with each other. Thus, the angular displacement or rotational angle of the electric motor 13 is detected based on the encoder pulse count regardless of whether the rotor rotates in the normal direction or the reverse direction, and the motor winding in the phase corresponding to the detected angular displacement or rotational angle is energized to rotate the rotor of the electric motor 13. The phase-Z signal of the encoder 31 is used to detect a reference rotational angle of the rotor of the electric motor 13.

The angular displacement or rotational angle of the electric motor 13 is converted into a controlled variable of the gear range selector mechanism 11, i.e., a slid distance of the parking rod 19, through a rotation transmitting mechanism including the speed reducer 14, the output shaft 15, the detent lever 18, etc. There is play or lost motion between these components of the rotation transmitting mechanism. For example, there is play or backlash between the gears of the speed reducer mechanism 14. If a joint having a noncircular cross section on the tip end of the rotational shaft of the electric motor 13 is fitted into a hole in the output shaft 15, then a clearance needs to be provided between the joint and the inner surface of the hole to allow the joint to be easily fitted into the hole.

Figure 3:
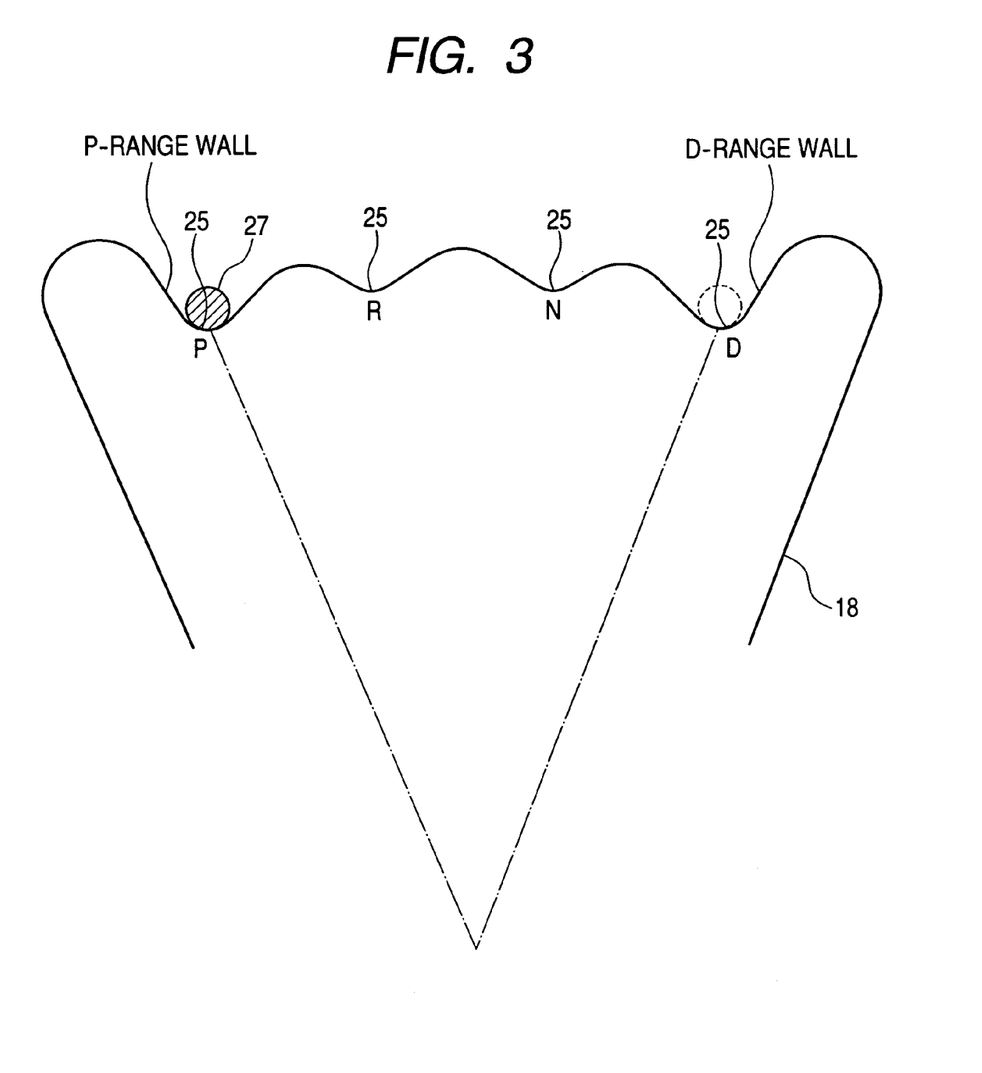
FIG. 3 is an enlarged fragmentary side elevational view showing the relationship between retaining recesses in a detent lever and an engaging bar of a detent spring.

As shown in FIG. 3, when the engaging bar 27 of the detent spring 26 is fitted into either one of the retaining recesses 25 in the detent lever 18 in the P range and the D range, there is small gap or lost motion between the engaging bar 27 and side walls of the retaining recesses 25. Since the rotation transmitting mechanism for converting the angular displacement or rotational angle of the electric motor 13 into a controlled variable of the gear range selector mechanism 11, i.e., a slid distance of the parking rod 19, has play or lost motion due to the backlash and gap between the components, even when the angular displacement or rotational angle of the electric motor 13 is accurately controlled based on the encoder pulse count, the resultant controlled variable of the gear range selector mechanism 11 suffers an error commensurate with the play or lost motion of the rotation transmitting system. Consequently, the controlled variable of the gear range selector mechanism 11 cannot be controlled with accuracy.

According to the present embodiment, the ECU 33 has a function (learning capability) to learn the amount of play included in the rotation transmitting mechanism. Specifically, for learning the amount of play included in the rotation transmitting mechanism, a "P-range wall bump control" process is performed to rotate the electric motor 13 in the reverse direction until the engaging bar 27 of the detent spring 26 bumps into a side wall of the P-range retaining recess 27 (hereinafter referred to as "P-range wall") at a limit position near the P range of the movable range of the gear range selector mechanism 11, to learn an encoder pulse count Np at the position of the P-range wall (learned value at the position of the P range), and an "N-range wall bump control" process is performed to rotate the electric motor 13 in the normal direction until the engaging bar 27 of the detent spring 26 bumps into a side wall of the D-range retaining recess 27 (hereinafter referred to as "D-range wall") at a limit position near the D range of the movable range of the gear range selector mechanism 11, to learn an encoder pulse count Nds at the position of the D-range wall (learned value at the position of the D range). Thereafter, the difference (Nds-Np) between the encoder pulse count Nds at the position of the D-range wall and the encoder pulse count Np at the position of the P-range wall is determined as a measured value of the movable range of the gear range selector mechanism 11, and then the difference between the measured value of the movable range and the designed movable range of the gear range selector mechanism 11 is learned as the amount of play in the rotation transmitting system. Subsequently, for rotating the electric motor 13 to a target position (target count), the target position is determined in view of the learned amount of play in the rotation transmitting system and the direction in which the electric motor 13 is rotated. According to this process, even if the rotation transmitting system includes play or lost motion, it is possible to establish a target position including that play or lost motion, and to accurately control the controlled variable of the gear range selector mechanism 11.

The gear range selector mechanism 11 according to the present embodiment selects the four ranges, i.e., the P, R, N, and D ranges. Therefore, for learning the amount of play in the rotation transmitting system, the P-range wall bump control process is performed, and thereafter the D-range wall bump control process needs to be performed when the transmission is shifted successively into the P, R, N, and D ranges. While the gear range selector mechanism shifts the transmission between the P, R, and N ranges after the engine starts to operate, the D-range wall bump control process cannot be performed. This is because if the transmission is automatically shifted into the D range against the will of the driver while the engine is in operation, then the vehicle may get into motion undesirably. Consequently, until the driver moves the gear shift lever into the D range, the amount of play in the rotation transmitting system cannot be learned, and the controlled variable of the gear range selector mechanism 11 suffers an error commensurate with the play or lost motion of the rotation transmitting system. As a result, the gear range selector mechanism 11 may possibly fail to select desired gear ranges based on the gear shift lever operated by the driver.

According to the present embodiment, before the amount of play in the rotation transmitting system is learned, when a gear range is to be selected, an overshooting control process is performed to cause the angular position of the rotor of the electric motor 13 to overshoot the desired target gear range and then reverse the rotor. The amount (overshooting amount) by which the electric motor 13 overshoots the target gear range and the amount (reversing amount) by which the electric motor 13 is reversed are set to an identical value. The overshooting amount is set to a maximum value $\Delta Gmax$ of the designed amount of play of the rotation transmitting system. After the amount of play in the rotation transmitting system is learned, when a gear range is to be selected, a target count (target position) is established in view of the learned amount of play and the direction in which the electric motor 13 is rotated, and the electric motor 13 is not caused to overshoot the desired target gear range, but is stopped when the encoder pulse count reaches the target count.

Figure 4:
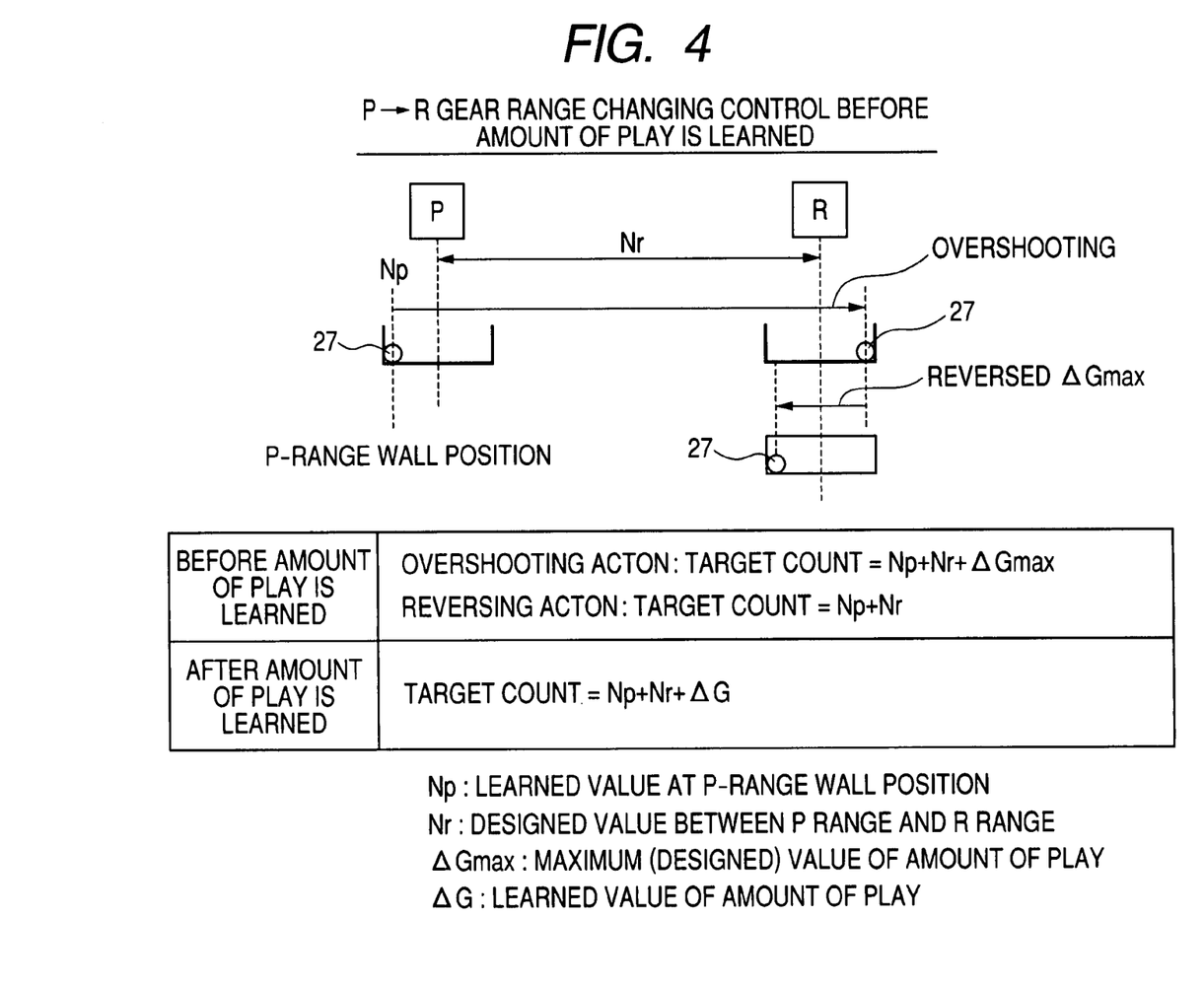
FIG. 4 is a diagram illustrative of a control process for changing gear ranges from a P range to a R range before the amount of play in a rotation transmitting system is learned.

A control process for changing gear ranges between the P range and the N range before the amount of play in a rotation transmitting system is learned will be described below with reference to FIGS. 4 through 6. Generally, when the ignition switch of the vehicle is turned on, i.e. when the engine of the vehicle starts to operate, the gear shift lever of the automatic transmission 12 is in the P range (the target gear range is the P range). Therefore, immediately after the ignition switch is turned on, the P-range wall bump control process is performed to reverse the electric motor 13 until the engaging bar 27 of the detect spring 26 bumps into the P-range wall to determine an encoder pulse count Np at the position of the P-range wall (learned value at the position of the P range).

Figure 5:
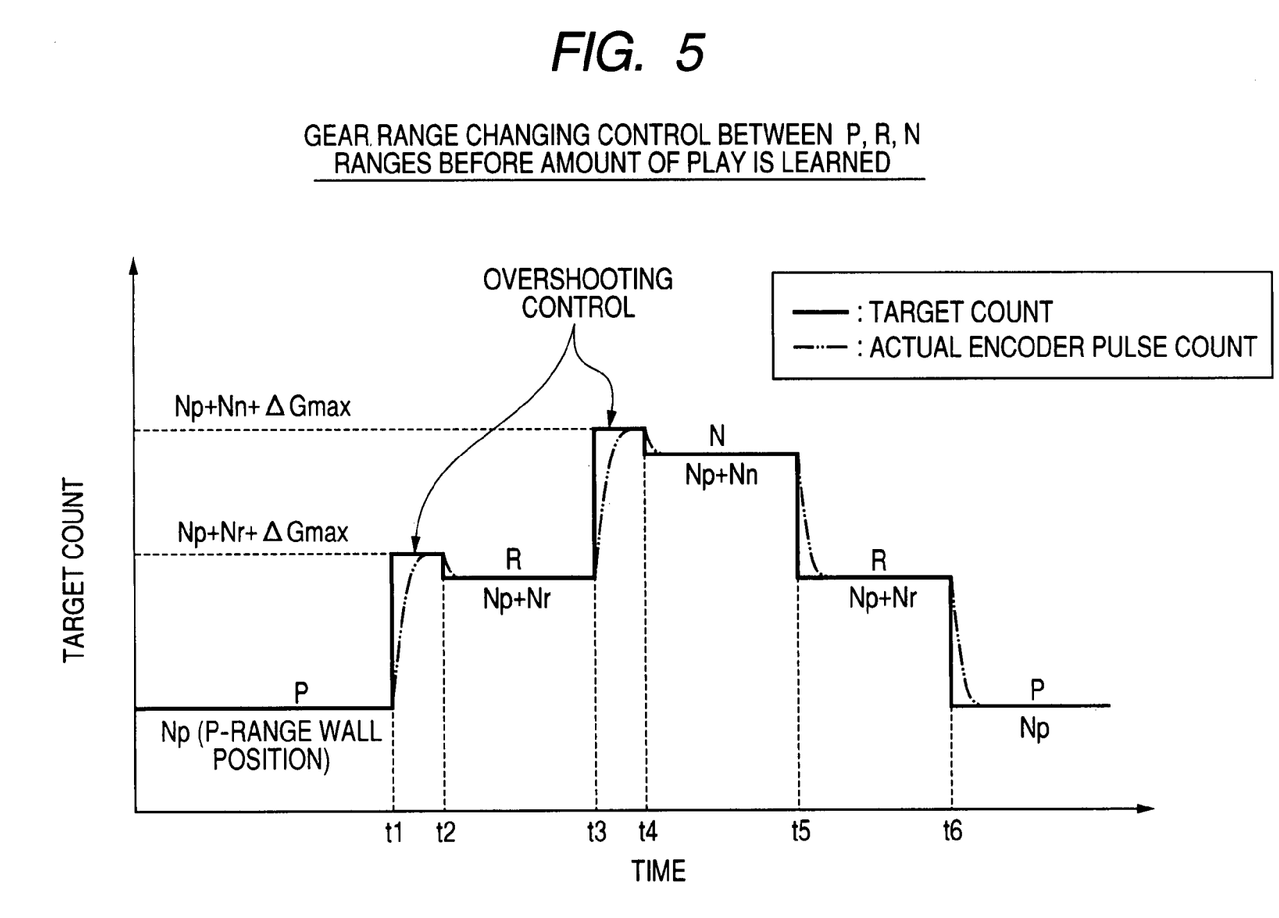
FIG. 5 is a timing chart illustrative of a control process for changing gear ranges between P, R, and N ranges before the amount of play in a rotation transmitting system is learned.

Thereafter, at time t1 in FIG. 5, when the gear shift lever is moved from the P range to the R range, and the target gear range switches to the R range, the target count is set to a value $(Np+Nr+\Delta Gmax)$ which represents the sum of a designed target count $(Np+Nr)$ for the R range and the overshooting amount $\Delta Gmax$. The overshooting amount $\Delta Gmax$ is set to a maximum value of the designed amount of play of the rotation transmitting system. The electric motor 13 is now rotated in the normal direction from the P range to the R range, and the operated position of the detent lever 18 reaches the inherent target position for the R range. The angular position of the electric motor 13 overshoots the inherent target position for the R range.

At time t2 when the overshooting action of the electric motor 13 is finished, the target count is reset to the inherent target count (Np+Nr) for the R range. The angular position of the electric motor 13 is now reversed by the overshooting amount ΔGmax (the maximum value of the designed amount of play of the rotation transmitting system). At this time, the detent lever 18 is not shifted back, and only the electric motor 13 idles by the play or lost motion in the rotation transmitting system.

If the overshooting amount ΔGmax of the electric motor 13 is greater than the actual amount of play in the rotation transmitting system, then the detent lever 18 moves beyond the target position by the difference between the overshooting amount ΔGmax and the amount of play. However, because the overshooting amount ΔGmax and the reversing amount are set to an identical value, the operated position of the detent lever 18 reliably goes back to the target position due to reversal of the electric motor 13.

Subsequently, at time t3 shown in FIG. 5, when the gear shift lever is moved from the R range to the N range, and the target gear range switches to the N range, the target count is set to a value (Np+Nn+ΔGmax) which represents the sum of a designed target count (Np+Nn) for the N range and the overshooting amount ΔGmax. The electric motor 13 is now rotated in the normal direction from the R range to the N range, and the operated position of the detent lever 18 reaches the inherent target position for the N range. The angular position of the electric motor 13 overshoots the inherent target position for the N range.

At time t4 when the overshooting action of the electric motor 13 is finished, the target count is reset to the inherent target count (Np+Nn) for the N range. The angular position of the electric motor 13 is now reversed by the overshooting amount ΔGmax (the maximum value of the designed amount of play of the rotation transmitting system). At this time, the detent lever 18 is not shifted back, and only the electric motor 13 idles by the play or lost motion in the rotation transmitting system.

Subsequently, at time t5 shown in FIG. 5, when the gear shift lever is moved from the N range to the R range, and the target gear range switches to the R range, the target count is set to the target count (Np+Nr) for the R range. Since the electric motor 13 is reversed for shifting the automatic transmission 12 from the N range to the R range, the rotating direction of the electric motor 13 is the same as the direction of the reversing action in the overshooting control process. In this rotating direction, as the play in the rotation transmitting system is eliminated from the start of rotation of the electric motor 13, the electric motor 13 does not idle from the start of rotation of the electric motor 13, and the angular displacement or rotational angle of the electric motor 13 is fully converted into the angular displacement or rotational angle of the detent lever 18. Consequently, when the automatic transmission 12 is shifted from the N range to the R range, for example, in the reversing direction of the electric motor 13, the target count is set without adding the overshooting amount ΔGmax, i.e., the overshooting control process is not performed. The electric motor 13 is rotated in the reversing direction from the N range to the R range, and is stopped when the operated position of the detent lever 18 reaches the inherent target position for the R range.

Subsequently, at time t6 shown in FIG. 5, when the gear shift lever is moved from the R range to the P range, and the target gear range switches to the P range, the target count is set to the target count Np for the P range, with the overshooting amount ΔGmax being not added. The electric motor 13 is rotated in the reversing direction from the R range to the P range, and is stopped when the operated position of the detent lever 18 reaches the inherent target position for the P range, i.e., the P-range wall position.

Subsequently, at time t11 shown in FIG. 7, when the gear shift lever is moved from the P range to the D range, and the target gear range switches to the D range, the target count is set to a value (Np+Nd+ΔGmax) which represents the sum of a designed target count (Np+Nd) for the D range and the overshooting amount ΔGmax. The electric motor 13 is now rotated in the normal direction from the P range to the D range, and the operated position of the detent lever 18 reaches the inherent target position for the D range. The angular position of the electric motor 13 overshoots the inherent target position for the D range.

Subsequently, at time t12 shown in FIG. 7, the D-range wall bump control process is performed. In the D-range wall bump control process, the target count is set to a maximum value, and the electric motor 13 is rotated in the normal direction. The engaging bar 27 of the detent spring 26 bumps into the D-range wall to determine an encoder pulse count Nds at the position of the D-range wall (learned value at the position of the D range). Thereafter, the difference (Nds−Np) between the encoder pulse count Nds at the position of the D-range wall and the encoder pulse count Np at the position of the P-range wall is determined as a measured value of the movable range of the gear range selector mechanism 11. Then, the difference between the measured value (Nds−Np) of the movable range and the designed movable range ΔNs of the gear range selector mechanism 11 is learned as the amount of play ΔG in the rotation transmitting system according to the equation shown below. The learned amount of play ΔG in the rotation transmitting system is stored in a memory of the ECU 33.

$$\Delta G = (Nds - Np) - \Delta Ns$$

At time t13 when the learning of the amount of play ΔG is finished, the target count is set to a value (Np+Nd+ΔG) which represents the sum of the designed target count (Np+Nd) for the D range and the learned amount of play ΔG. The electric motor 13 is now reversed to bring the operated position of the detent lever 18 back to the inherent target position for the D range.

The above control process for changing gear ranges is carried out by the ECU 33 according to routines shown in FIGS. 7 through 10. Details of the routines shown in FIGS. 7 through 10 will be described below.

Figure 7:
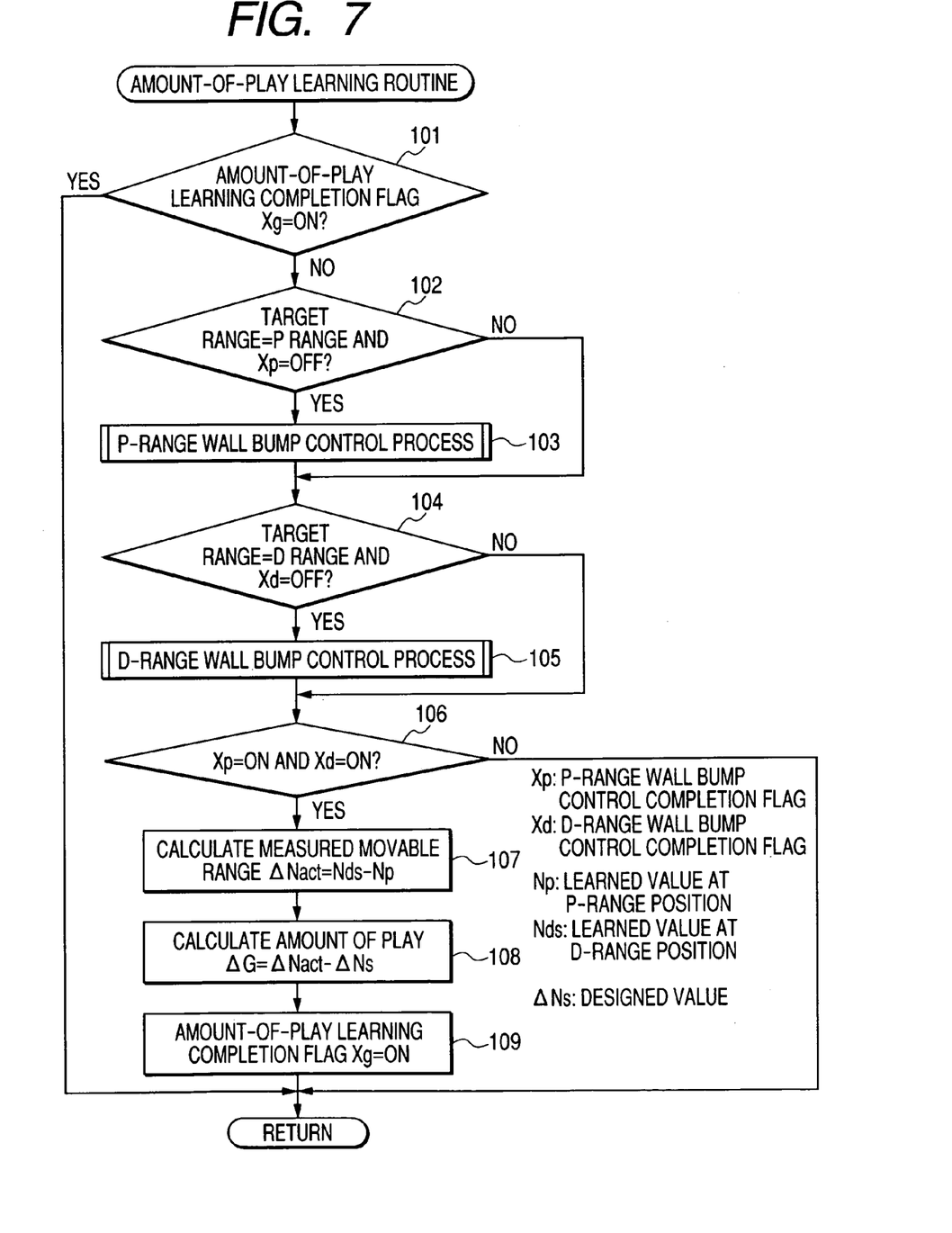
FIG. 7 is a flowchart of an amount-of-play learning routine.

FIG. 7 shows an amount-of-play learning routine which is executed in cyclic periods of 8 ms, for example, after the ignition switch is turned on. When the amount-of-play learning routine is activated, it is determined whether an amount-of-play learning completion flag Xg is ON (representing a state after the completion of the learning of the amount of play) or not in step 101. If the amount-of-play learning completion flag Xg is ON, then no further processing is performed, and the present routine is put to an end. Therefore, the amount-of-play learning routine is executed only once while the ignition switch is being turned on. The amount-of-play learning completion flag Xg is reset to OFF by an initializing routine (not shown) that is executed immediately after the ignition switch is turned on.

If it is judged that the amount-of-play learning completion flag Xg is OFF (representing a state before the completion of the learning of the amount of play) in step 101, then control goes to step 102. In step 102, it is determined whether the target gear range is the P range and a P-range wall bump control completion flag Xp is OFF (representing a state before the completion of the P-range wall bump control process) or not. If the answer is "Yes" in step 102, then control goes to step 103 in which the P-range wall bump control process is performed and the encoder pulse count Np at the position of the P-range wall (learned value at the position of the P range) is stored in the memory of the ECU 33.

If the answer is "No" in step 102, then control jumps to step 104. In step 104, it is determined whether the target gear range is the D range and a D-range wall bump control completion flag Xd is OFF (representing a state before the completion of the D-range wall bump control process) or not. If the answer is "Yes" in step 104, then control goes to step 105 in which the D-range wall bump control process is performed and the encoder pulse count Nds at the position of the D-range wall (learned value at the position of the D range) is stored in the memory of the ECU 33.

Thereafter, control goes to step 106 to determine whether both the P-range wall bump control process and the D-range wall bump control process have been completed or not, i.e., whether the P-range wall bump control completion flag Xp is ON and the D-range wall bump control completion flag Xd is ON or no. If either one of the P-range wall bump control process and the D-range wall bump control process has not yet been completed, then no subsequent processing is performed, and the present routine is put to an end.

If both the P-range wall bump control process and the D-range wall bump control process have been completed, then control goes to step 107 in which a measured value ΔNact of the movable range of the electric motor 13, i.e., the movable range of the detent lever 18, from the P-range wall to the D-range wall is calculated, using the learned value Np at the position of the P range and the learned value Nds at the position of the D range, as follows:

$$\Delta Nact = Nds - Np$$

Thereafter, control goes to step 108 in which the difference between the measured value ΔNact of the movable range of the electric motor 13, i.e., the movable range of the detent lever 18, and the designed movable range ΔNs is learned as the amount of play ΔG in the rotation transmitting system according to the equation shown below, and stored in the memory of the ECU 33.

$$\Delta G = \Delta Nact - \Delta Ns$$

The designed movable range ΔNs may be calculated based on design data or may comprise a central value of the movable ranges of motors 13 and detent levers 18 as mass-produced products, i.e., a measured value of the movable range of a standard motor 13 and a standard detent lever 18.

Thereafter, control goes to step 109 in which the amount-of-play learning completion flag Xg is set to ON representing the completion of the learning of the amount of play. Then, the present routine is set to an end.

Figure 8:
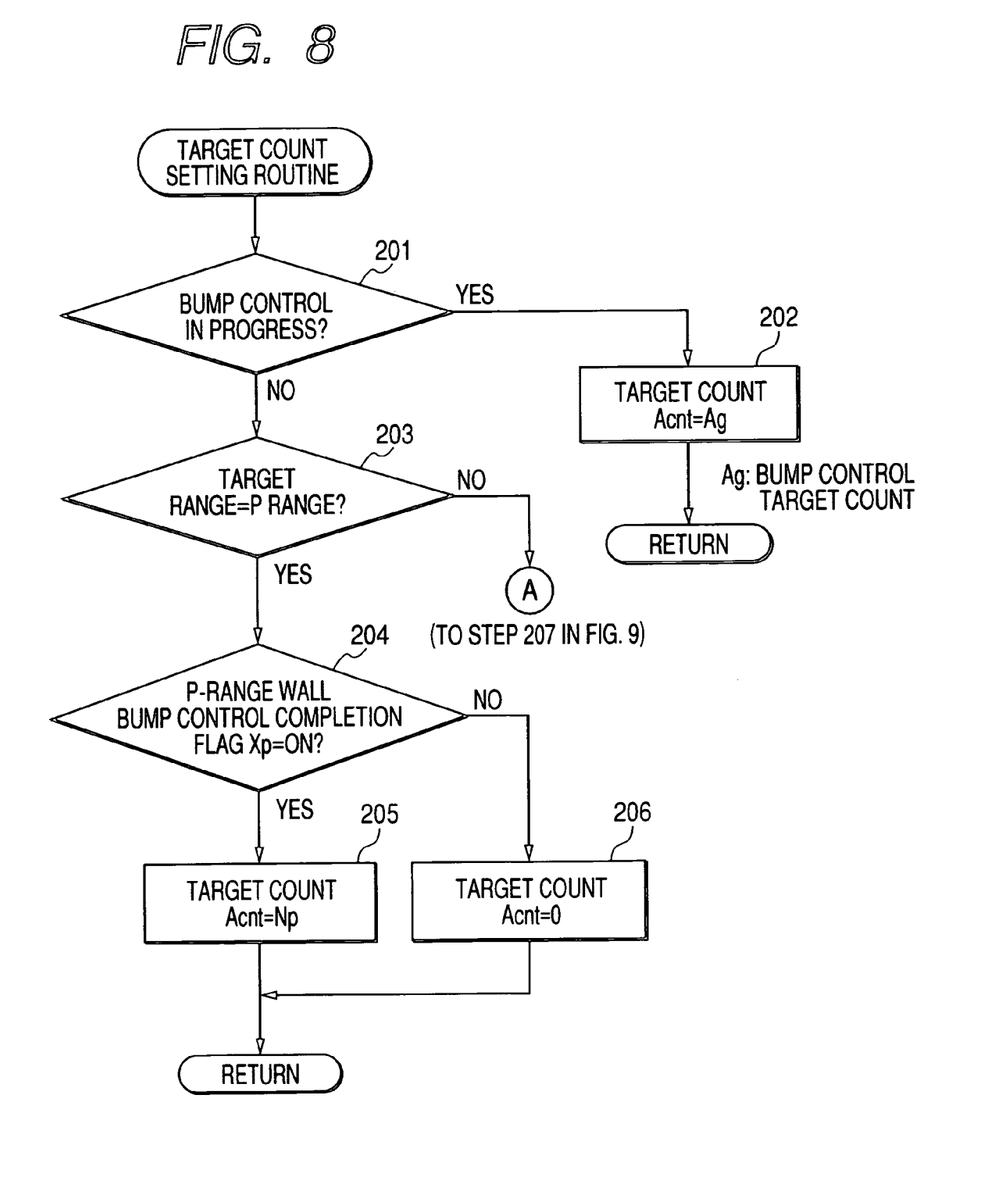
FIGS. 8 through 10 are a flowchart of a target count setting routine.
Figure 9:
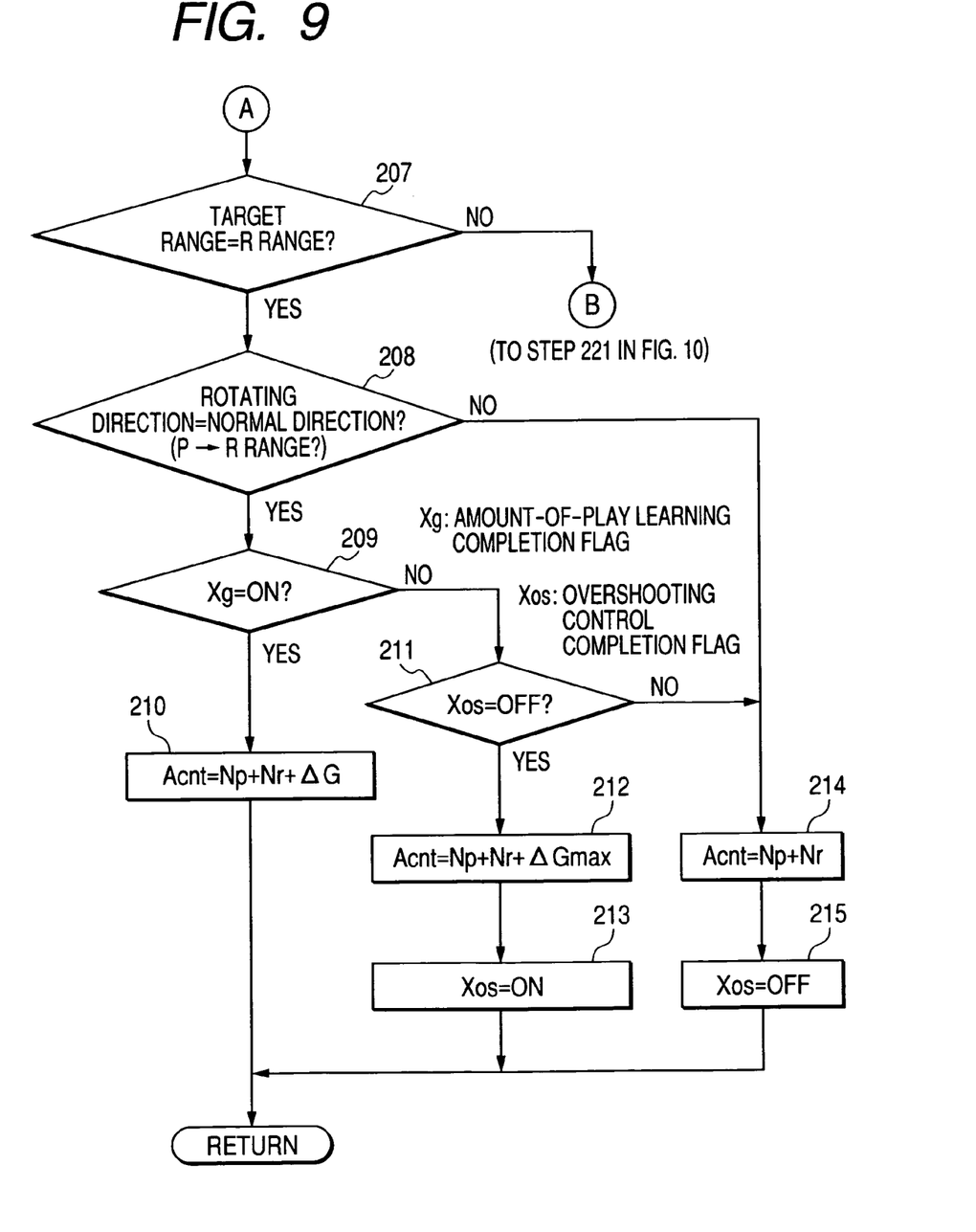
Figure 10:
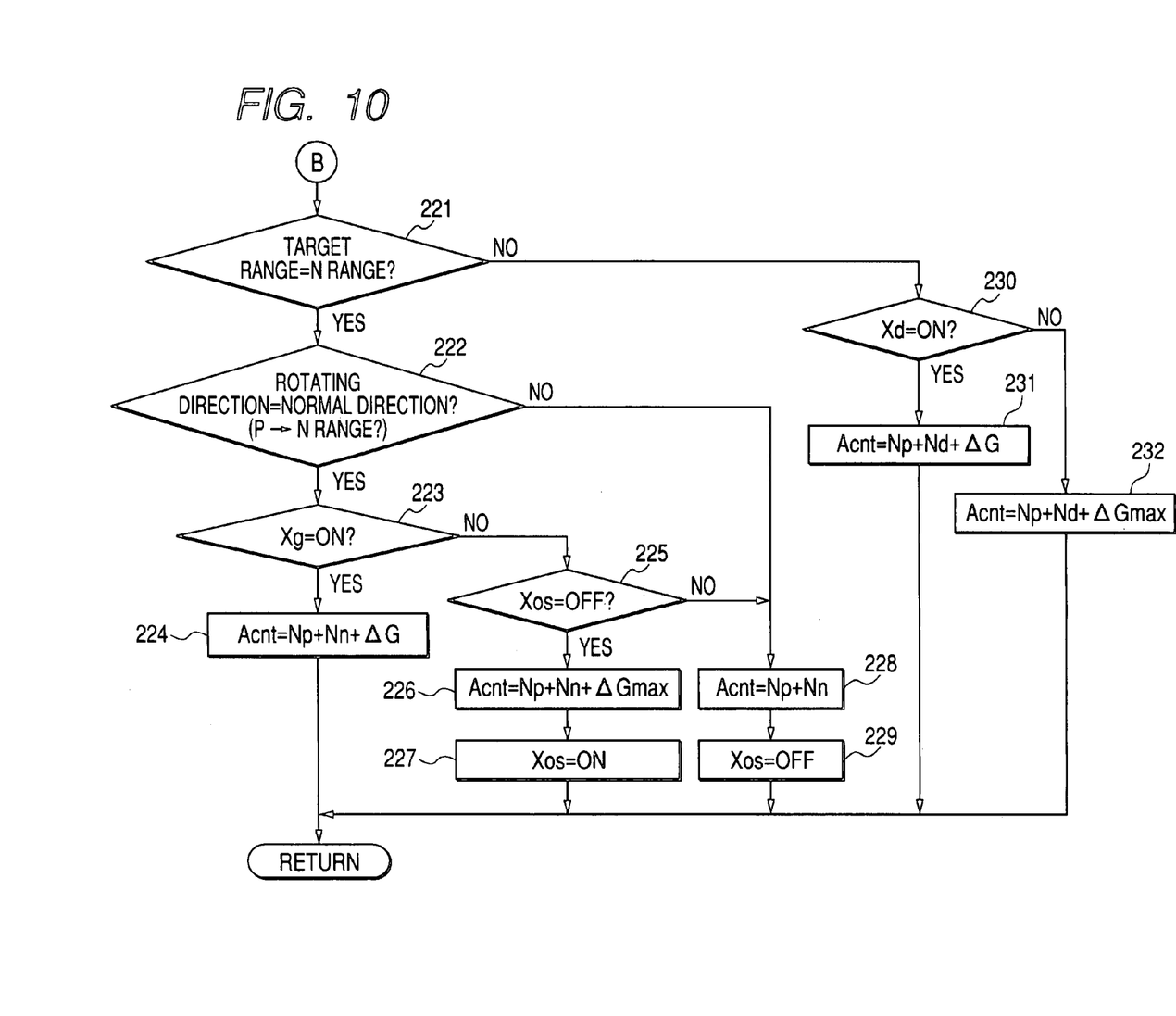

FIGS. 8 through 10 show a target count setting routine. The target count setting routine is executed in cyclic periods of 8 ms, for example, after the ignition switch is turned on. When the target count setting routine is activated, it is determined in step 201 whether either one of the P-range wall bump control process and the D-range wall bump control process is being performed or not. If it is judged that either one of the P-range wall bump control process and the D-range wall bump control process is being performed, then control goes to step 202 in which a target count Acnt is set to a bump control target count Ag. The bump control target count Ag is set to a minimum value, i.e., a value for causing the engaging bar 27 to bump reliably into the P-range wall, while the P-range wall bump control process is being performed, and is set to a maximum value, i.e., a value for causing the engaging bar 27 to bump reliably into the D-range wall, while the D-range wall bump control process is being performed.

If it is judged in step 201 that neither one of the P-range wall bump control process and the D-range wall bump control process is being performed, then control goes to step 203 to determine whether the target gear range is the P range or not. If it is judged that the target gear range is the P range, then control goes to step 204 to determine whether the P-range wall bump control process is completed or not, i.e., whether the P-range wall bump control completion flag Xp is ON or not. If it is judged that the P-range wall bump control process is completed, then control goes to step 205 in which the target count Acnt is set to the learned value Np at the position of the P range, as follows:

$$Acnt = Np$$

If it is judged that the P-range wall bump control process is not completed (the answer is "No" in step 204), then control goes to step 206 in which the target count Acnt is set to "0" which is a temporary target count for the P range.

If it is judged that the target gear range is not the P range in step 203, then control goes to step 207 shown in FIG. 9. In step 207, it is determined whether the target gear range is the R range or not. If the target gear range is the R range, then control goes to step 208 to determine whether the rotating direction of the electric motor 13 is the normal direction, i.e., the direction from the P range to the R range, or not. If it is judged that the rotating direction of the electric motor 13 is the normal direction, i.e., the direction from the P range to the R range, then control goes to step 209 to determine whether the amount-of-play learning completion flag Xg is ON (representing the completion of the learning of the amount of play) or not. If it is judged that the amount-of-play learning completion flag Xg is ON, then control goes to step 210 in which the target count Acnt is set to a value which represents the sum of the designed target count (Np+Nr) for the R range and the learned amount of play ΔG in the rotation transmitting system, as follows:

$$Acnt = Np + Nr + \Delta G$$

where Np represents the learned value at the position of the P-range wall and Nr the encoder pulse count between the P range and the R range.

If it is judged in step 209 that the amount-of-play learning completion flag Xg is OFF (representing a state before the completion of the learning of the amount of play), then control goes to step 211 to determine whether an overshooting control completion flag Xos is OFF (representing a state before the completion of the overshooting control process) or not. If it is judged that the overshooting control completion flag Xos is OFF, then control goes to step 212 in which the target count Acnt is set to a value which represents the sum of the designed target count (Np+Nd) for the D range and the overshooting amount ΔGmax, as follows:

$$Acnt = Np + Nd + \Delta Gmax$$

where Nd represents the encoder pulse count between the P range and the D range. The overshooting amount $\Delta G$max is set to a maximum value (designed value) of the amount of play in the rotation transmitting system.

Thereafter, control goes to step 213 in which the overshooting control completion flag Xos is set to ON (representing the completion of the overshooting control process).

If it is judged in step 211 that the overshooting control completion flag Xos is ON (representing the completion of the overshooting control process), or if it is judged in step 208 that the rotating direction of the electric motor 13 is the reverse direction, i.e., the direction from the N range to the R range, then control goes to step 214 in which the designed target count (Np+Nr) for the R range is directly set to the target count Acnt, as follows:

$Acnt=Np+Nr$

Thereafter, control goes to step 215 in which the overshooting control completion flag Xos is set to OFF (representing a state before the completion of the overshooting control process). If gear ranges are changed in the reverse direction of the electric motor 13, as from the N range to the R range, then the target count Acnt is set without adding the overshooting amount $\Delta G$max.

If it is judged in step 207 that the target gear range is not the R range, then control goes to step 221 shown in FIG. 10. In step 221, it is determined whether the target gear range is the N range or not. If it is judged that the target gear range is the N range, then control goes to step 222 to determine whether the rotating direction of the electric motor 13 is the normal direction, i.e., the direction from the P range to the N range, or not. If it is judged that the rotating direction of the electric motor 13 is the normal direction, i.e., the direction from the P range to the N range, then control goes to step 223 to determine whether the amount-of-play learning completion flag Xg is ON (representing the completion of the learning of the amount of play) or not. If it is judged that the amount-of-play learning completion flag Xg is ON, then control goes to step 224 in which the target count Acnt is set to a value which represents the sum of the designed target count (Np+Nn) for the N range and the learned amount of play $\Delta G$ in the rotation transmitting system, as follows:

$Acnt=Np+Nn+\Delta G$ where Nn represents the encoder pulse count between the P range and the N range.

If it is judged in step 223 that the amount-of-play learning completion flag Xg is OFF (representing a state before the completion of the learning of the amount of play), then control goes to step 225 to determine whether the overshooting control completion flag Xos is OFF (representing a state before the completion of the overshooting control process) or not. If it is judged that the overshooting control completion flag Xos is OFF, then control goes to step 226 in which the target count Acnt is set to a value which represents the sum of the designed target count (Np+Nn) for the N range and the overshooting amount $\Delta G$max, as follows;

$Acnt=Np+Nn+\Delta G\text{max}$ where Nn represents the encoder pulse count between the P range and the N range.

Thereafter, control goes to step 227 in which the overshooting control completion flag Xos is set to ON (representing the completion of the overshooting control process).

If it is judged in step 225 that the overshooting control completion flag Xos is ON (representing the completion of the overshooting control process), or if it is judged in step 222 that the rotating direction of the electric motor 13 is the reverse direction, i.e., the direction from the D range to the N range, then control goes to step 228 in which the designed target count (Np+Nn) for the N range is directly set to the target count Acnt without adding the overshooting amount $\Delta G$max, as follows:

$Acnt=Np+Nn$

Thereafter, control goes to step 229 in which the overshooting control completion flag Xos is set to OFF (representing a state before the completion of the overshooting control process).

If it is judged in step 221 that the target gear range is not the N range, then control goes to step 230 to determine whether the D-range wall bump control completion flag Xd is ON (representing the completion of the D-range wall bump control process) or not. If it is judged that the D-range wall bump control completion flag Xd is ON, then control goes to step 231 in which the target count Acnt is set to a value which represents the sum of the designed target count (Np+Nd) for the D range and the learned amount of play $\Delta G$ in the rotation transmitting system, as follows:

$Acnt=Np+Nd+\Delta G$

If it is judged in step 230 that the D-range wall bump control completion flag Xd is OFF (representing a state before the completion of the D-range wall bump control process), then control goes to step 232 which the target count Acnt is set to a value which represents the sum of the designed target count (Np+Nd) for the D range and the overshooting amount $\Delta G$max, as follows:

$Acnt=Np+Nd+\Delta G\text{max}$

Figure 6:
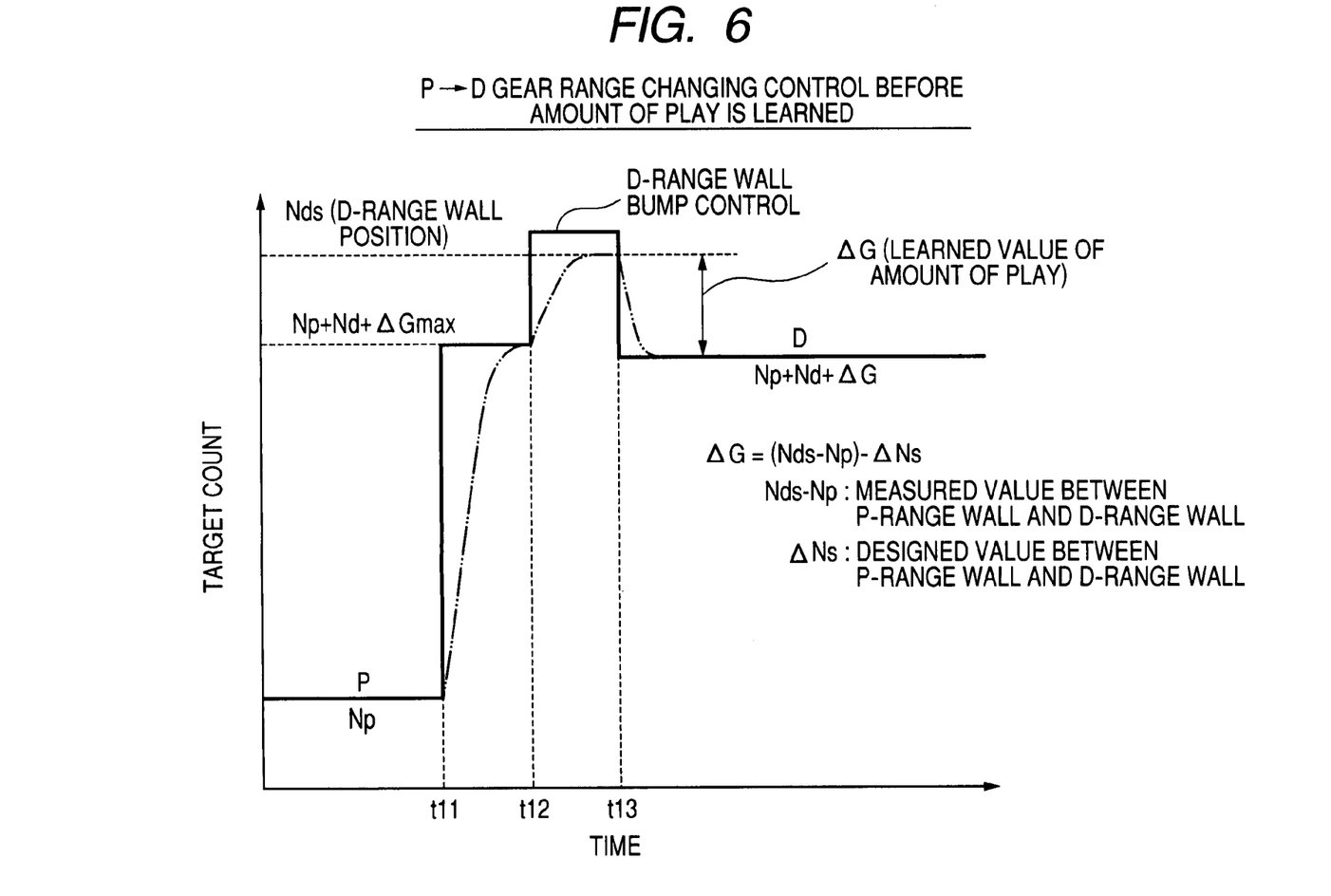
FIG. 6 is a timing chart illustrative of a control process for changing gear ranges from the P range to a D range before the amount of play in a rotation transmitting system is learned.

After the temporary target count Acnt for the D range has thus been established, as shown in FIG. 6, the D-range wall bump control process is performed to learn the learned value Nds at the position of the D range. Thereafter, the difference between the measured value (Nds−Np) from the encoder pulse count Np at the position of the P-range wall to the encoder pulse count Nds at the position of the D-range wall, and the designed value $\Delta$Ns is calculated as the learned amount of play $\Delta G$ in the rotation transmitting system, and the value (Np+Nd+$\Delta G$) which represents the sum of the designed target count (Np+Nd) for the D range and the learned amount of play $\Delta G$ is set as the target count Acnt.

According to the present embodiment, as described above, before the amount of play $\Delta G$ in the rotation transmitting system is learned, when a gear range is to be selected, the overshooting control process is performed to cause the angular position of the rotor of the electric motor 13 to overshoot the desired target gear range and then reverse the rotor. At the start of rotation of the electric motor 13, even if only the electric motor 13 idles until the play or lost motion in the rotation transmitting system is eliminated, the electric motor 13 is rotated an extra angle corresponding to the idling amount, i.e., the amount of play, at the start of rotation of the electric motor 13 according to the overshooting control process to make it possible to shift the automatic transmission 12 to a target gear range. When the electric motor 13 is rotated back from the overshot position, only the electric motor 13 can idle an angle corresponding to the play or lost motion in the rotation transmitting system without moving back the detent lever 18 of the gear range selector mechanism 11. Therefore, even before the amount of play in the rotation transmitting system is learned, the automatic transmission 12 can be shifted highly accurately into the target gear range without being affected by the play or lost motion in the rotation transmitting system. The accuracy with which to change gear ranges is therefore increased.

If the overshooting amount of the electric motor 13 is greater than the actual amount of play in the rotation transmitting system, then the detent lever 18 moves beyond the target position by the difference between the overshooting amount and the amount of play. However, because the overshooting amount and the reversing amount are set to an identical value according to the present embodiment, the operated position of the detent lever 18 reliably goes back to the target position due to reversal of the electric motor 13.

If the overshooting amount of the electric motor 13 is smaller than the amount of play in the rotation transmitting system, then the overshooting amount the electric motor 13 is smaller than the idling amount thereof at the start of rotation of the electric motor 13, resulting in a shortage of the operated amount of the detent lever 18. Conversely, if the overshooting amount of the electric motor 13 is too large, a gear range control delay due to the overshooting control process may possibly become non-negligible.

According to the present embodiment, since the overshooting amount of the electric motor 13 is set to a designed maximum value of the amount of play in the rotation transmitting system, the overshooting amount of the electric motor 13 is greater than the idling amount thereof (the amount of play) at the start of rotation of the electric motor 13 at all times. Consequently, the detent lever 18 can reliably be shifted to the target position, and any gear range control delay due to the overshooting control process is minimized. The same advantages as described above may be achieved even if the overshooting amount of the electric motor 13 is set to a value that is slightly greater than a designed maximum value of the amount of play in the rotation transmitting system.

If the rotating direction of the electric motor 13 is the same as the direction in which the angular position thereof is reversed in the preceding overshooting control process, then since the play or lost motion in the rotation transmitting system has been eliminated from the start of rotation of the electric motor 13, the electric motor 13 does not idle from the start of rotation thereof, and the angular displacement or rotational angle of the electric motor 13 is converted in its entirety into the angular displacement or rotational angle of the detent lever 18.

According to the present embodiment, if the rotating direction of the electric motor 13 is the same as the direction in which the angular position thereof is reversed in the preceding overshooting control process, then the overshooting control process is not performed. Consequently, gear changes can be selected with a good response.

The gear range selector mechanism 11 is arranged to select the four gear ranges, i.e., the P, R, N, and D ranges. However, the gear range selector mechanism 11 may be arranged to select six gear ranges including the above four gear ranges, a second gear range (2), and a low gear range (L) The present invention is applicable to a gear range selector mechanism for selecting three or more gear ranges.

The principles of the present invention are not limited to a gear range selector mechanism, but are also applicable to various position selecting apparatus having an electric motor as an actuator.

Although a certain preferred embodiment of the present invention has been shown and described in detail, it should be understood that various changes and modifications may be made therein without departing from the scope of the appended claims.

What is claimed is:

1. A motor control apparatus for controlling the angular displacement of an electric motor as an actuator for selecting operated positions of a controlled object, comprising:
   a controller for performing an overshooting control process to cause the angular displacement of the electric motor to overshoot a target position corresponding to one, which is to be selected, of the operated positions of the controlled object, and thereafter reverse the electric motor.

2. A motor control apparatus according to claim 1, wherein said angular displacement of the electric motor overshoots said target position by a first amount, and said electric motor is reversed by a second amount, said first amount and said second amount being identical to each other.

3. A motor control apparatus according to claim 1, further comprising:
   a rotation transmitting system for transmitting the angular displacement of the electric motor to said controlled object, said rotation transmitting system including an amount of play;
   wherein said angular displacement of the electric motor overshoots said target position by an amount which is equal to or greater than a maximum value of said amount of play in said rotation transmitting system.

4. A motor control apparatus according to claim 1, further comprising:
   a rotation transmitting system for transmitting the angular displacement of the electric motor to said controlled object, said rotation transmitting system including an amount of play; and
   a learning unit for learning the amount of play in said rotation transmitting system by rotating said electric motor until a movable element of said rotation transmitting system bumps into a limit position of a movable range of said controlled object;
   wherein before said learning unit learns the amount of play in said rotation transmitting system, said controller performs said overshooting control process for selecting said one of the operated positions of said controlled object, and after said learning unit learns the amount of play in said rotation transmitting system, said controller establishes said target position in view of the learned amount of play and a direction in which said electric motor rotates, and stops said electric motor at said target position for selecting said one of the operated positions of said controlled object, without performing said overshooting control process.

5. A motor control apparatus according to claim 1, wherein if a direction in which said electric motor rotates is the same as a direction in which said electric motor is reversed in said overshooting control process, then said controller controls the angular displacement of the electric motor to reach the target position corresponding to said one of the operated positions of the controlled object, without performing said overshooting control process.

6. A motor control apparatus according to claim 1, wherein said controlled object comprises a gear range selector mechanism for selecting gear ranges of an automatic transmission for use on a vehicle.

* * * * *